(12) United States Patent
Kwong et al.

(10) Patent No.: US 11,689,814 B1
(45) Date of Patent: Jun. 27, 2023

(54) SYSTEM AND A METHOD FOR PROCESSING AN IMAGE

(71) Applicant: Centre for Intelligent Multidimensional Data Analysis Limited, Hong Kong (CN)

(72) Inventors: Sam Tak Wu Kwong, Hong Kong (CN); Zhangkai Ni, Hong Kong (CN); Yue Liu, Hong Kong (CN); Shiqi Wang, Hong Kong (CN)

(73) Assignee: CENTRE FOR INTELLIGENT MULTIDIMENSAIONAL DATA ANALYSIS LIMITED, Hong Kong (CN)

( * ) Notice: Subject to any disclaimer, the term of this patent is extended or adjusted under 35 U.S.C. 154(b) by 0 days.

(21) Appl. No.: 17/540,468

(22) Filed: Dec. 2, 2021

(51) Int. Cl.
*H04N 23/741* (2023.01)
*G06T 5/40* (2006.01)
*G06T 5/00* (2006.01)
*G06N 3/08* (2023.01)

(52) U.S. Cl.
CPC ............. *H04N 23/741* (2023.01); *G06N 3/08* (2013.01); *G06T 5/009* (2013.01); *G06T 5/40* (2013.01)

(58) Field of Classification Search
None
See application file for complete search history.

(56) References Cited

U.S. PATENT DOCUMENTS 10,147,166 B2 * 12/2018 Johnson .................. G06T 3/403

FOREIGN PATENT DOCUMENTS

JP 2012034340 A * 2/2012 ........... H04N 5/2355
WO WO-2018136373 A1 * 7/2018 ............. G06T 5/002

OTHER PUBLICATIONS

English translation of WO-2018136373-A1, Liao, 2018 (Year: 2018).*
English translation of JP-2012034340-A,, Manabe, 2012 (Year: 2012).*
Endo, Y., et al., "Deep Reverse Tone Mapping", ACM Transactions on Graphics, vol. 36, No. 6, Article 177, Nov. 2017, pp. 177:1 to 177:10.
Mamerides, D., et al., ExpandNet: A Deep Convolutional Neural Network for High Dynamic Range Expansion from Low Dynamic Range Content, Eurographics 2018, vol. 37, 2018, No. 2, pp. 1-13.

(Continued)

*Primary Examiner* — James M Hannett
(74) *Attorney, Agent, or Firm* — Moser Taboada

(57) ABSTRACT

A system and a method for processing an image. The system comprises an image gateway arranged to receive an input image showing a scene composed by a combination of a plurality of image portions of the input image, wherein one or more of the plurality of image portions is associated with an exposure level deviated from an optimal exposure level; and an enhancement engine arranged to process the input image by applying an exposure/image relationship to the input image, wherein the exposure/image relationship is arranged to adjust the exposure level of each of the plurality of image portions towards the optimal exposure level; and to generate an enhanced image showing a visual representation of the scene composed by a combination of the plurality of image portions of the input image with an adjusted exposure level.

13 Claims, 11 Drawing Sheets

(56) References Cited

OTHER PUBLICATIONS

Eilertsen, G., et al., "HDR image reconstruction from a single exposure using deep CNNs", ACM Transactions on Graphics, vol. 36, No. 6, Article 178, Nov. 2017, pp. 178:1 to 178:15.
Santos, M.S., et al., "Single Image HDR Reconstruction Using a CNN with Masked Features and Perceptual Loss", ACM Transactions on Graphics, vol. 39, No. 4, Article 80, Jul. 2020, pp. 80:1 to 80:10.
Liu, Y.L. et al., "Single-Image HDR Reconstruction by Learning to Reverse the Camera Pipeline", arXiv:2004.01179 (eess), pp. 1-10.

* cited by examiner (a) SCAM (b) ECMLM

SYSTEM AND A METHOD FOR PROCESSING AN IMAGE

TECHNICAL FIELD

The invention relates to a system and a method for processing an image, and particularly, although not exclusively, to a system and method for enhancing dynamic range of an image.

BACKGROUND

The capturing, viewing and processing of photographs, videos and other images are common activities amongst photographers, media producers or social media users. With commonly accessible image or video capturing equipment such as digital cameras, action cameras or smart devices (e.g. smartphones) with cameras, images and videos have become a common and expected form of media for communications and the sharing of ideas or knowledge between different people.

Despite advances in photography and the use of photographic equipment, environmental conditions may nonetheless limit the quality of the videos or images captured in real world conditions. Insufficient lighting is a problem that users suffer, which in turn causes degradations in visibility, brightness, contrast and details. In turn, when environmental conditions turn undesirable, such as in low light conditions or in environments where there are strong variations in lighting conditions, a video or image that is captured by a user may appear to be aesthetically poor or undesirable.

SUMMARY OF THE INVENTION

In accordance with a first aspect, there is provided a method for processing an image comprising the steps of: receiving an input image showing a scene composed by a combination of a plurality of image portions of the input image, wherein one or more of the plurality of image portions is associated with an exposure level deviated from an optimal exposure level; and processing the input image by applying an exposure/image relationship to the input image, wherein the exposure/image relationship is arranged to adjust the exposure level of each of the plurality of image portions towards the optimal exposure level; and generating an enhanced image showing a visual representation of the scene composed by a combination of the plurality of image portions of the input image with an adjusted exposure level.

In an embodiment of the first aspect, the one or more of the plurality of image portions is associated with an over-exposure level or an under-exposure level.

In an embodiment of the first aspect, the exposure levels include tones, contrasts or color shifts of image pixels in each of the plurality of image portion.

In an embodiment of the first aspect, the one or more of the plurality of image portions is further associated with loss of details in a visual representation of the image due to the over-exposure level or the under-exposure level associated with the corresponding image portions of the image.

In an embodiment of the first aspect, the step of processing the input image by applying the exposure/image relationship to the input image comprises the step of recovering visual details in the image portions associated with the over-exposure level or the under-exposure level.

In an embodiment of the first aspect, the step of processing the input image by applying the exposure/image relationship to the input image comprises the step of processing gated images $I_o$ or $I_u$ indicating respectively the image portions associated with the over-exposure level or the under-exposure level with a confidence map $M_o$ or $M_u$, to determine a probability of information loss in the corresponding image portion.

In an embodiment of the first aspect, the confidence map is further represented by $M_o^i$ or $M_u^i$ of multiple scales i indicating the level of over-exposure or under-exposure.

In an embodiment of the first aspect, the confidence map $M_o^i$ or $M_u^i$ is represented by $W_f \times W_m$, wherein $W_f$ denotes a feature weight map obtained by passing an output feature map associated with the $(i-1)^{th}$ scale through a convolution layer and a Sigmoid function, and $W_m$ denotes a downsampled confidence map of the $i^{th}$ scale obtained by average pooling operation of a confidence map of the $(i-1)^{th}$ scale.

In an embodiment of the first aspect, the confidence map is trained by a learning network.

In an embodiment of the first aspect, the learning network is a convolution neural network (CNN).

In an embodiment of the first aspect, the learning network has a progressive learning structure.

In an embodiment of the first aspect, the step of processing the input image by applying the exposure/image relationship to the input image comprises the step of progressively recovering visual details of different image portions associated with different over-exposure levels or different under-exposure level with confidence maps $M_o^i$ or $M_u^i$ of multiple scales i.

In an embodiment of the first aspect, the gated images are greyscale image of the input image.

In an embodiment of the first aspect, the step of processing the input image by applying the exposure/image relationship to the input image comprises the step of expanding a dynamic range of the input image.

In an embodiment of the first aspect, the step of expanding the dynamic range of the input image comprises the step of concatenating features of remaining image portions of the input image with the optimal exposure level and the image portions associated with the over-exposure level or the under-exposure level with recovered visual details.

In an embodiment of the first aspect, the step of generating the enhanced image further comprising the step of generating a high dynamic range (HDR) image based on the input image of a standard dynamic range (SDR) image.

In an embodiment of the first aspect, the step of expanding the dynamic range of the input image comprises the step of processing the image with one or more image quality loss processes.

In an embodiment of the first aspect, the one or more image quality loss processes is arranged to train a network for expanding the dynamic range of the input image.

In accordance with a second aspect, there is provided a system for processing an image comprising an image gateway arranged to receive an input image showing a scene composed by a combination of a plurality of image portions of the input image, wherein one or more of the plurality of image portions is associated with an exposure level deviated from an optimal exposure level; and an enhancement engine arranged to process the input image by applying an exposure/image relationship to the input image, wherein the exposure/image relationship is arranged to adjust the exposure level of each of the plurality of image portions towards the optimal exposure level; and to generate an enhanced image showing a visual representation of the scene composed by a combination of the plurality of image portions of the input image with an adjusted exposure level.

In an embodiment of the second aspect, the one or more of the plurality of image portions is associated with an over-exposure level or an under-exposure level.

In an embodiment of the second aspect, the exposure levels include tones, contrasts or color shifts of image pixels in each of the plurality of image portion.

In an embodiment of the second aspect, the one or more of the plurality of image portions is further associated with loss of details in a visual representation of the image due to the over-exposure level or the under-exposure level associated with the corresponding image portions of the image.

In an embodiment of the second aspect, the enhancement engine comprises an exposure gated detail recovering module arranged to recover visual details in the image portions associated with the over-exposure level or the under-exposure level.

In an embodiment of the second aspect, the enhancement engine is trained by a learning network.

In an embodiment of the second aspect, the learning network is a convolution neural network (CNN).

In an embodiment of the second aspect, the learning network has a progressive learning structure.

In an embodiment of the second aspect, the enhancement engine progressively recovering visual details of different image portions associated with different over-exposure levels or different under-exposure level of multiple scales i.

In an embodiment of the second aspect, the enhancement engine further comprises a dynamic range expansion module arranged to expand a dynamic range of the input image.

In an embodiment of the second aspect, the dynamic range expansion module includes a feature fusion module arranged to combine features of remaining image portions of the input image with the optimal exposure level and the image portions associated with the over-exposure level or the under-exposure level with visual details recovered by the exposure gated detail recovering module.

In an embodiment of the second aspect, the enhanced image includes a high dynamic range (HDR) image and the input image includes a standard dynamic range (SDR) image.

In an embodiment of the second aspect, the input image includes a single standard dynamic range (SDR) image.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1:
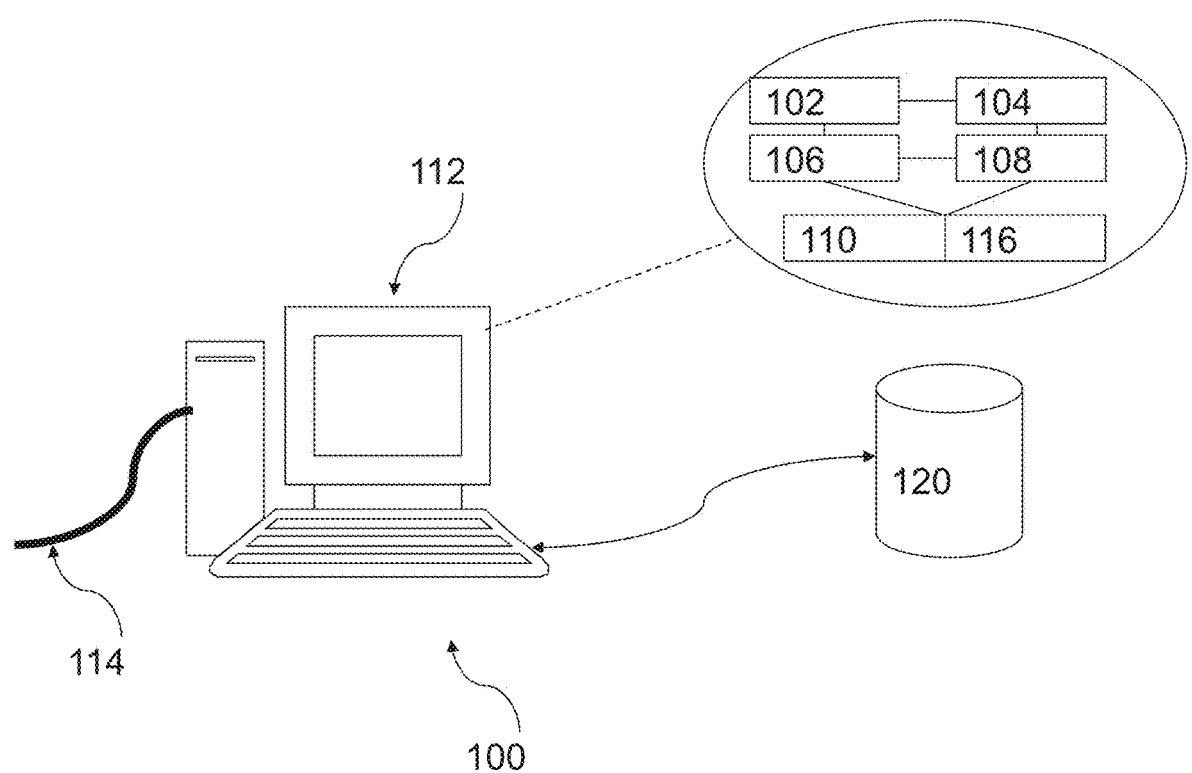
FIG. 1 is a schematic diagram of a computer server which is arranged to be implemented as a system for processing an image in accordance with an embodiment of the present invention.

The inventors have devised that a predominant problem in reconstructing high dynamic range (HDR) images from standard dynamic range (SDR) ones lies in the absence of texture and structural information in under/over-exposed regions. In this invention, an efficient and stable HDR reconstruction method, namely exposure-induced network (EIN), for a single SDR image with arbitrary exposure and content is provided.

In one preferred embodiment, two exposure gated detail recovering branches (EGDRB) may be delicately designed to progressively infer the texture and structural details with the learned confidence maps to resolve challenging ambiguities in local under/over-exposed regions. Simultaneously, the dynamic range expansion branch (DREB) that interacts with EGDRBs is dedicated to expanding the global dynamic range of the image.

The features from these three interactional branches are adaptively merged in the feature fusion stage to reconstruct the final HDR image. A convolution neural network may be built and trained based upon a large generated dataset.

Advantageously, extensive experimental results demonstrate that the present invention achieves consistent visual quality improvement for input SDR images with different exposures compared with other methods such as Expandnet, HDRCNN, DrTMO, HDRRec and SingleHDR.

The inventors have devised that HDR reconstruction may involve expanding luminance dynamic range and various methods can be generally classified into global-based approaches and local-based approaches. The global-based methods are designed based on a mapping function to expand the dynamic range of the entire SDR images. The local-based approaches have also been used to dynamically reconstruct the contrast and details of saturated regions with local information. Various methods, e.g., median-cut algorithm based light sources detection, edge stop function, and bilateral filter, may be adopted for detection and luminance expansion of the saturated region.

These methods have shown impressive results in terms of luminance dynamic range expansion. However, they usually involve considerable manually-set parameters that need to be adjusted for better visual quality. In addition, only limited textures in saturated regions can be reconstructed by expanding the luminance map.

Preferably, convolutional neural networks (CNNs) may be employed in handling various computer vision tasks. The learning-based HDR reconstruction methods can be roughly classified into multi-exposure fusion-based indirect methods and direct methods with an end-to-end network. However, some CNN methods apply the same convolution kernel to the entire image, which could potentially lead to the adverse impact between the under/over-exposed regions and other regions, and cause unnatural artifacts.

The inventors have further devised that content-driven attention models may be employed to recover the missing contrast and textures in the saturated area, for example, by generating a mask to locate the over-exposed region, which is subsequently fed into the U-net for prediction, while the rest regions are mapped with a gamma function. In addition, it is devised that producing learnable masks may further improve the model.

However, these methods are unable to solve the problems of the missing information in the under-exposed regions and how the dynamic range of the entire image is expanded.

Referring to FIG. 1, an embodiment of the present invention is illustrated. This embodiment is arranged to provide a system for processing an image comprising: an image gateway arranged to receive an input image showing a scene composed by a combination of a plurality of image portions of the input image, wherein one or more of the plurality of image portions is associated with an exposure level deviated from an optimal exposure level; and an enhancement engine arranged to process the input image by applying an exposure/image relationship to the input image, wherein the exposure/image relationship is arranged to adjust the exposure level of each of the plurality of image portions towards the optimal exposure level; and to generate an enhanced image showing a visual representation of the scene composed by a combination of the plurality of image portions of the input image with an adjusted exposure level.

In this example embodiment, the interface and processor are implemented by a computer having an appropriate user interface.

The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

The system may be used to receive an input image, such as a standard dynamic range (SDR) image which may include both under-exposed regions and over-exposed regions captured by a camera, and generate an output image, such as an enhanced image with expanded or improved dynamic range, or a high dynamic range (HDR) image. Preferably, an HDR image may produce a better visual impression to a viewer of the image when compared to viewing an SDR image due to the image's dynamic range limitation, with loss of textural or structural details due to over-/under-exposure or the lighting intensity or color of different regions of the image not in an optimized level.

As shown in FIG. 1 there is a shown a schematic diagram of a computer system or computer server 100 which is arranged to be implemented as an example embodiment of a system for processing an image. In this embodiment the system comprises a server 100 which includes suitable components necessary to receive, store and execute appropriate computer instructions. The components may include a processing unit 102, including Central Processing United (CPUs), Math Co-Processing Unit (Math Processor), Graphic Processing United (GPUs) or Tensor processing united (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc.

Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
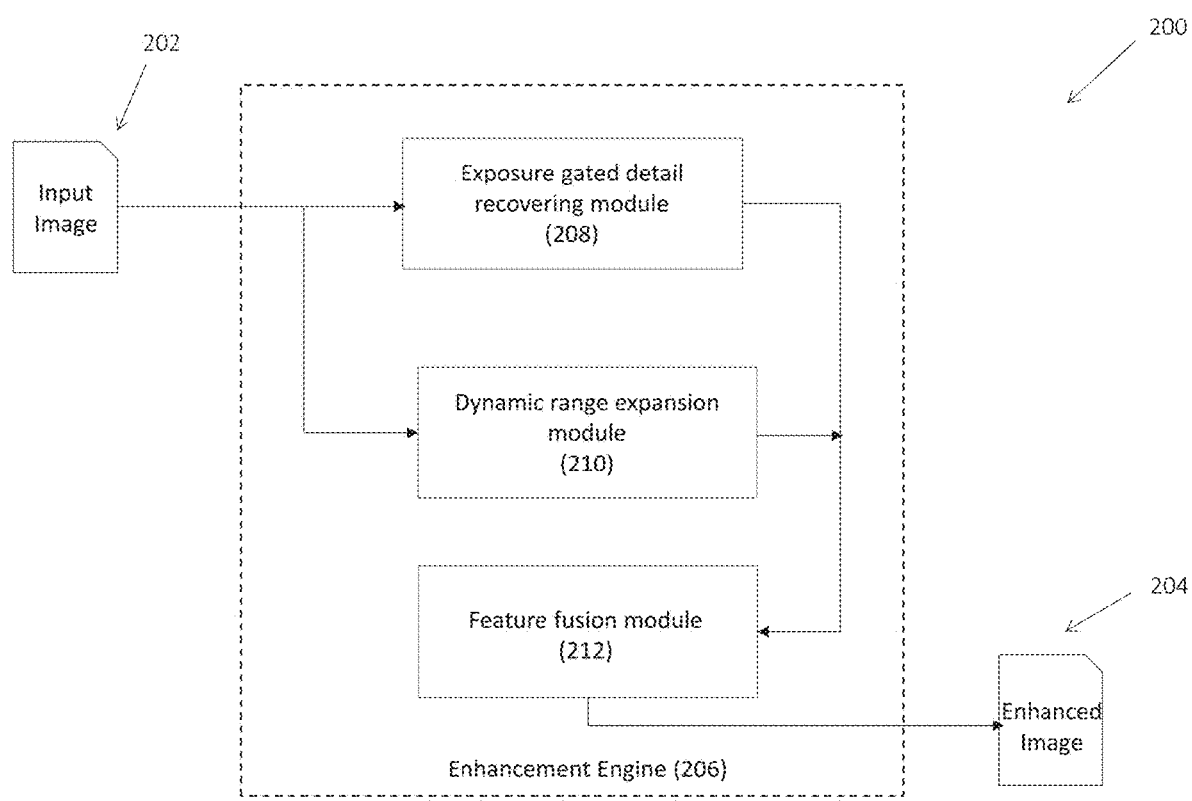
FIG. 2 is a block diagram showing a system for processing an image in accordance with an embodiment of the present invention.

With reference to FIG. 2, there is shown an embodiment of the system 200 for processing an image. In this embodiment, the server 100 is used as part of a system 200 as arranged to receive an input image 202, process the input image 202 such as by applying an exposure/image relationship to the input image 202, and finally generate an enhanced image 204 showing a visual representation of the scene composed by a combination of the plurality of image portions of the input image 202 with an adjusted exposure level. Preferably, the system 200 "corrects" portions of the image which has an exposure level deviated from an optimal exposure level, e.g. over-exposed or under-exposed, which may also lead to a loss of visual details such as textures and/or structural details.

For example, the input image 202 may originally show a scene composed by a combination of a plurality of image portions of the input image 202, with one or more of these image portions captured with an exposure level deviated from an optimal exposure level, either being over-exposed or under-exposed, as the exposure level may be set to certain value according to the overall exposure level determined based on the entire image when it was captured. In this example, the enhancement engine 206 may correct these over-exposed or under-exposed portions by applying an exposure/image relationship to adjust the exposure level of each of the plurality of image portions towards the optimal exposure level, such as by adjusting one or more of tones, contrasts or color shifts of image pixels in each of the plurality of image portion.

In this example, a single SDR image 202 is processed by the enhancement engine 206 and the enhancement engine 206 is further arranged to generate an HDR image 204 based on just the only SDR image 202 provided. Alternatively, SDR images of different exposure levels may also be processed by the enhancement engine to provide more sources of information being processed by the enhancement engine which may help enhancing the image further.

Preferably, the enhancement engine 206 comprises an exposure gated detail recovering module 208 arranged to recover visual details in the image portions associated with the over-exposure level or the under-exposure level. As described earlier, over-exposed or under-exposed portions in the image 202 may be presented with unclear or even loss of textural or structural details. For example, the entire portion showing the sky may be completely over-exposed and the SDR image may render such a portion in white color entirely without any pattern or features.

By recovering the details using the exposure gated detail recovering module 206, details such as clouds or a representation of the sun may be recovered and rendered in the enhanced image 204 to be generated.

In addition, the enhancement engine 206 further comprises a dynamic range expansion module 210 arranged to expand a dynamic range of the input image. For example, proper color tones of the sky in blue color may be presented in the final enhanced image 204 after adjustment.

Furthermore, a feature fusion module 212 may be used to combine features of remaining image portions of the input image 202 with the optimal exposure level and the image portions associated with the over-exposure level or the under-exposure level with visual details recovered by the exposure gated detail recovering module 208, therefore, in addition to tuning the color representation of the sky, details such as clouds and any other features such as planes may be recovered if the captured input image originally captured these details but unable to present these details due to over-exposure or under-exposure of these portions. Preferably, the feature fusion module 212 is arranged to consider all features and parameters identified by the dynamic range expansion module and the exposure gated detail recovering module, as further described below with reference to FIGS. 3 to 10.

To reconstruct realistic HDR images with a wide range of luminance from a single SDR image, the latent information loss that highly sensitive to the HVS should be understood. Due to the intrinsic capability of HDR reconstruction in expanding the scene dynamic range, the fine details that are invisible in bright and dark regions of SDR are expected to be well perceived.

However, it is still quite challenging to discern and recover the predominant missing information due to the ill-posed nature.

Figure 3:
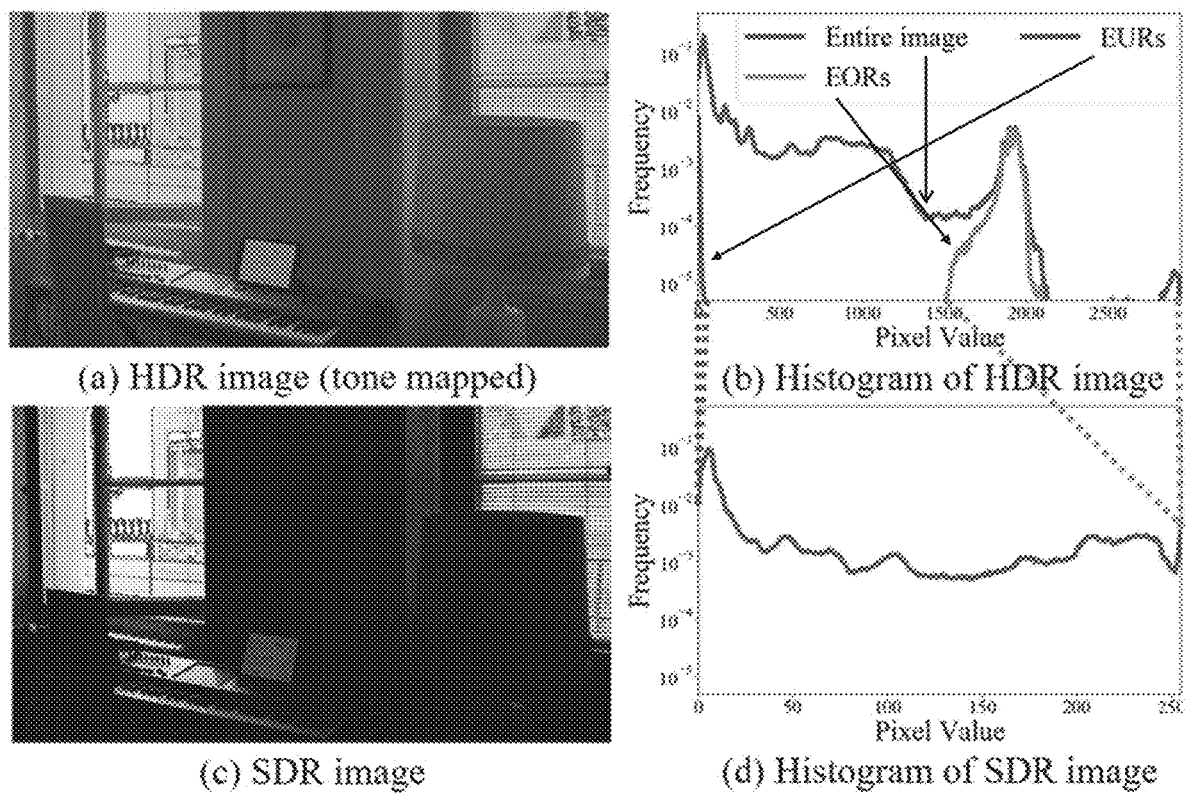
FIG. 3 is an illustration showing comparisons of the SDR and HDR images on extremely over-exposed regions (EORs) and extremely under-exposed regions (EURs), respectively. The corresponding histograms ((b) and (d)) are shown on the right. In the (a) SDR image, pixel value 255 and 0 are assigned as EORs and EURs, respectively. Herein, the EORs/EURs are enclosed by the red/blue lines in the (c) HDR image, which are co-locate with the SDR image. It is shown that the HDR image contains richer texture and structural details in both EORs and EURs.

With reference to FIG. 3, the HDR and SDR images are captured in the same scene. It is apparent that the identified extremely under/over-exposed regions in SDR are not capable of guaranteeing high visibility texture and structural details. By contrast, the corresponding regions in the HDR image contain informative details. A wider span of pixel distribution in these regions (blue/red polylines in FIG. 3(b)) provides further evidence on the enriched gradient information. It is devised that the major difficulty in single-image HDR reconstruction arises from the inference of the texture and structural details in under/over-regions, therefore an improved design using EIN based on the diagnosing of visual quality impairments is devised.

Figure 4:
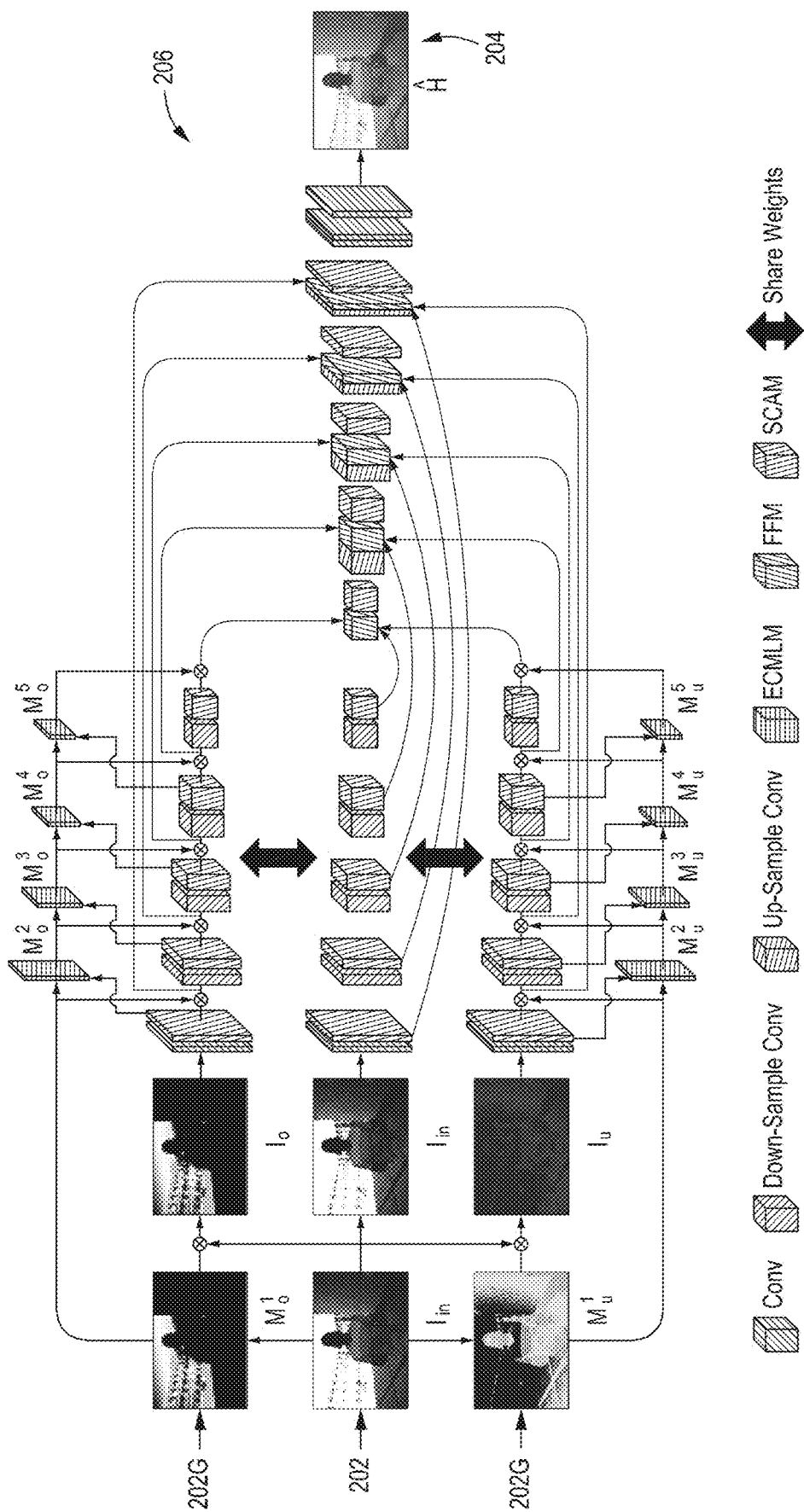
FIG. 4 is an illustration of a schematic structure of an enhancement engine of the system of FIG. 2, wherein the enhancement engine is trained by a learning network called exposure-induced network (EIN), in which two exposure gated detail recovering branches (EGDRB) share weights with the dynamic range expansion branch (DREB) to keep the dynamic range consistency and learn the detailed information in the exposure-guided confidence map learning module (ECMLM), and then the extracted features in the three branches are fused to generate the reconstructed HDR image.

Referring now to FIG. 4, in this example, the enhancement engine includes three branches that accept the dedicated input with different purposes. In particular, the upper and bottom branches are responsible for the detail recovery with the exposure elaborately induced, and the main branch expands the dynamic range. In this example, the exposure gated detail recovering module is arranged to process the input in the upper and bottom branches, and the dynamic range expansion module is arranged to process the image portions with optimized exposure level in the middle branches. These branches may also represent the exposure/image relationship being applied to the input image 202.

Preferably, given an input SDR image $I_{in}$, the source image $I_{in}$, gated images with under/over-exposed regions $I_o$ and $I_u$ are fed into these three corresponding branches. The two EGDRBs progressively learn the confidence maps in the ECMLM for missing detail reconstruction in the under/over-exposed regions. The generated confidence maps are capable of inferring appropriate details at the corresponding layer and delivering stable results for input SDR images of different exposures. The DREB takes $I_{in}$ as input to expand the dynamic range of the entire image.

Preferably, the confidence map is trained by a learning network, such as a convolution neural network (CNN). Training of the CNN will be further described later in this disclosure.

Finally, the extracted features from the three branches are merged to reconstruct the final HDR image, using the feature fusion module which will be further described in details.

Preferably, the Dynamic Range Expansion Branch (DREB) adopts a U-net-like structure to expand the dynamic range of the overall image. Taking $I_{in}$ as input, a convolutional layer (Conv) is first applied without down-sampling. In the subsequent four down-sample convolutional layers (Down-Sample Cony), the stride is set to 2 to reduce the spatial dimension by half consecutively. Preferably, this helps the network to learn a better down-sample function instead of the pooling function. In the convolutional layers, the reflection padding is adopted to suppress the edge artifacts.

Based on dual attention network, a spatial-channel attention module (SCAM) is incorporated after each convolutional layer to further adjust the weights of features along both the spatial and channel dimensions, as shown in FIG.

5A. First, given a feature map $F_{in} \in \mathbb{R}^{b \times c \times h \times w}$, two single-channel feature maps are generated across the channel dimensions using the max pooling and average pooling operations. The feature maps are concatenated to generate the weight map $W_s \in \mathbb{R}^{b \times 1 \times h \times w}$, which is used to redistribute the weights in F. Subsequently, the average pooling operation is applied to further compress the features in the spatial domain, and the weight map $W_c \in \mathbb{R}^{b \times c \times 1 \times 1}$ perform the weighting on F to obtain the feature map $F_c$. The two re-adjusted feature maps $F_s$ and $F_c$ are concatenated together through a convolutional layer to produce the refined feature map $\tilde{F}$.

The structural loss commonly occurs in the over-exposed regions of the SDR image due to the limitation of the maximum luminance of conventional cameras. Meanwhile, the texture loss caused by the quantization greatly degrades the visual quality in the under-exposed regions. As shown in FIG. 4, the Exposure Gated Detail Recovering Branches (EGDRBs) take two inputs: an initial confidence map $M_u/M_o$ and the corresponding gated image $I_u/I_o$ that indicates the under/over-exposed regions of the image $I_{in}$. The higher value in the confidence map $M_u/M_o$ represents a higher under/over-exposure degree in $I_{in}$, indicating the greater probability of information loss. At the i-th scale (except for the 0-th scale that represents the first Conv module and SCAM), ECMLM uses the confidence map $M_u^{i-1}$ of the previous scale and the output of the last SCAM to generate the confidence map $M_u^i$ of the current scale. The EGDRBs aim to delicately recover the missing information mentioned above. Rather than learning two independent branches, EGDRBs enjoy the weights learned in DREB and use the ECMLM to progressively learn adaptive confidence maps at each scale. On one hand, the features learned by EGDRBs are highly correlated with those learned by DREB to ensure the consistency between the local and global information of the reconstructed HDR images. On the other hand, the efficiency of the present invention is significantly improved.

Figure 6:
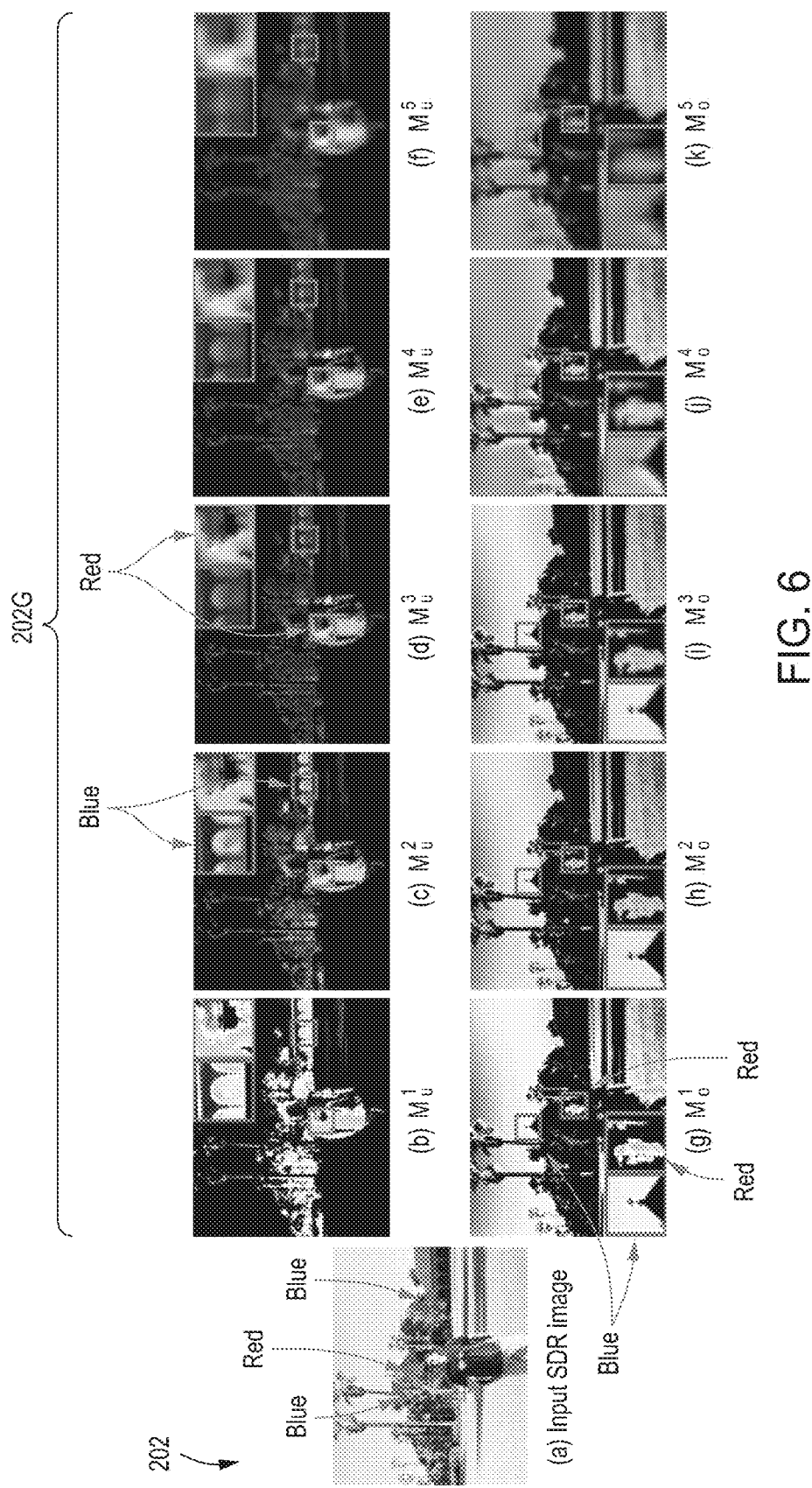
FIG. 6 are examples of generated confidence maps in EIN based on the input gate images. The input SDR image contains both under/over-exposed regions. In the confidence map $M_o^i$, the higher value represents a higher confidence that the pixel belongs to the over-exposed region. Analogously, the higher value represents a higher confidence that the pixel belongs to the under-exposed region in $M_u^i$. All the images are resized to the same scale for comparison.

In Original Confidence Map Generation, the Gaussian function is adopted to generate the original confidence maps as follows, $$M_o^1 = e^{\frac{-(I_g - \mu_0)^2}{\sigma}}, \quad (1)$$

where $I_g$ is the grayscale image of $I_{in}$. In one example embodiment, $\mu_o$ and $\sigma$ are empirically set to 0.95 and 0.01, respectively. FIG. 6 shows an example of the generated confidence maps ((b) and (g)). In $M_o^1$, the present method not only provides a higher weight to the more over-exposed pixel, but also compresses the values between 0.95 and 1, which helps to recover the extremely over-exposed regions. Analogously, the design philosophy is identical for $M_u^1$.

The Exposure-Guided Confidence Map Learning Module (ECMLM) aims to learn a confidence map to generate gated feature maps in each scale, guiding the network to progressively focus on extremely under/over-exposed regions. At the i-th scale, the down-sampled confidence map $$W_m \in \mathbb{R}^{b \times 1 \times \frac{h}{2} \times \frac{w}{2}}$$

is first produced by average pooling operation of the confidence map $$M_u^{i-1} \in \mathbb{R}^{b \times 1 \times h \times W}.$$

The output feature map $F_u^{i-1}$ of the last SCAM are squeezed to five single-channel features maps via max pooling operation, average pooling operation and another three convolutional layers with different kernel size (i.e., 5, 7, 11) to further learn the features based on different receptive fields. The squeezed features pass through a convolution layer and a Sigmoid function to obtain the feature weighting map $$W_f \in \mathbb{R}^{b \times 1 \times \frac{h}{2} \times \frac{w}{2}}.$$

Figure 5A:
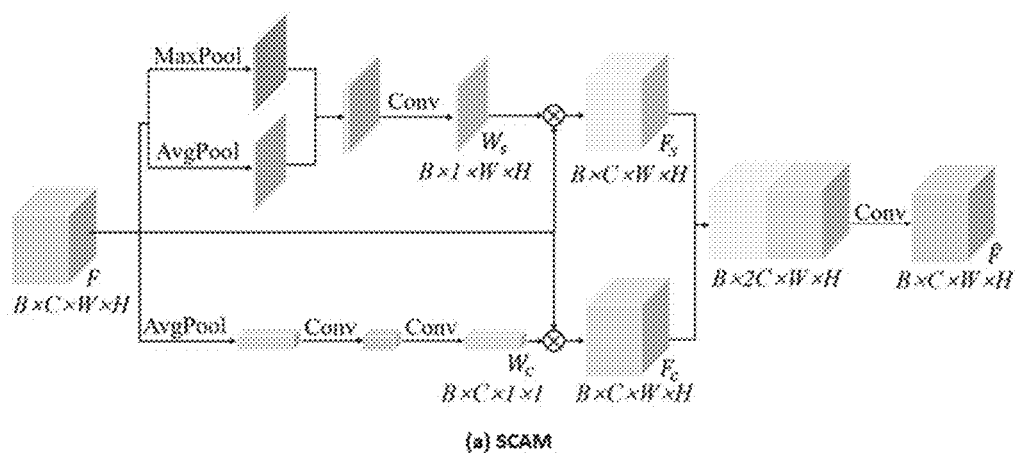
FIGS. 5A and 5B are Illustration of the structure of (a) SCAM, (b) ECMLM, respectively.
Figure 5B:
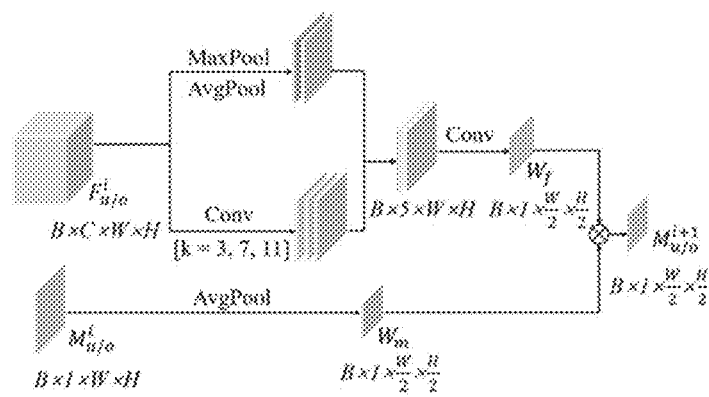

Finally, the confidence map for the i-th scale is obtained by $M_i^u = W_f \times W_f \times W_m$. The detailed structure of the ECMLM is shown in FIG. 5B, and the similar structure is applied to the over-exposed region.

Preferably EGDRB has a progressive learning structure with embedded ECMLMs. FIG. 5 shows the examples of generated confidence maps in EIN. The input SDR image contains both under/over-exposed regions. In particular, the reflection on the face (top red arrow) is visually more intense than the sky (left blue arrow), and the part of the clothes (bottom red arrow) is darker than the buildings in the shadows (right blue arrow). The two original confidence maps ((b) and (h) in FIG. 6) provide high confidence to all the regions mentioned above. In the learning stage, the face and the clothes (red bounding box) are allocated more attention in all five scales, while the sky and building (blue bounding box) are assigned less attention as the network deepens.

Advantageously, with an exposure-induced confidence map as guidance, the EGDRB can progressively recover the texture and structure details according to the degree of the exposure by the learned confidence maps. The extremely under/over-exposed regions are the key regions in the five confidence maps, while the other regions in the original confidence maps can be well recovered in the previous shallow scales. As the network goes deeper, the parameters of the network are mainly used for information recovery in the key areas with a higher confidence value.

As described earlier, the dynamic range expansion module includes a feature fusion module arranged to combine features of remaining image portions of the input image with the optimal exposure level and the image portions associated with the over-exposure level or the under-exposure level with visual details recovered by the exposure gated detail recovering module. In this stage, the features of the DREB and EGDRBs are merged with skip connections. In the i-th scale, the feature fusion module (FFM) concatenates the features of the DREB and the sum of the two EGDRBs as follows:

$$F_m^i = Conv(Conca(F_e^i, F_u^i \times M_u^i + F_o^i \times M_o^i)), \quad (2)$$

where $F_e^i, F_u^i, F_o^i$ are the outputs of the SCAM in the DREB, and two EGDRBs respectively. Conca and Conv are the concatenation and convolution operations through the channel dimensions, respectively. The output of the FFM is fed into the SCAM for feature reorganization, followed by the up-sample convolutional layer (Up-Sample Conv) to decode the features and finally reconstruct the HDR image.

Table 1. Quantitative evaluation result. The HDR-VDP-2, PSNR, SSIM, and FSIM are used to evaluate the quality of inferred HDR images.

|  |  | PSNR | | SSIM | | FSIM | |
|---|---|---|---|---|---|---|---|
| Methods | HDR-VDP-2 | Reinhard's TMO | L1L0 TMO | Reinhard's TMO | L1L0 TMO | Reinhard's TMO | L1L0 TMO |
| ExpandNet | 44.7697 | 18.2441 | 15.7045 | 0.7611 | 0.6262 | 0.8583 | 0.8306 |
| HDRCNN | 47.1621 | 17.7029 | 16.7424 | 0.6963 | 0.6754 | 0.8754 | 0.8623 |
| DrTMO | 47.9094 | 22.3491 | 16.5903 | 0.8190 | 0.7200 | 0.9136 | 0.8437 |
| HDRRec | 46.3465 | 16.0834 | 15.8351 | 0.6600 | 0.6505 | 0.8451 | 0.8517 |
| SingleHDR | 48.5772 | 22.5491 | 19.9097 | 0.8181 | 0.7578 | 0.9187 | 0.8780 |
| This invention | 49.7996 | 24.5132 | 19.9714 | 0.8868 | 0.7731 | 0.9302 | 0.8850 |

Due to the wide dynamic range and uneven distribution of the luminance value in HDR images, directly optimizing loss function based on HDR image is difficult to converge the network.

Preferably, expanding the dynamic range of the input image may further involve processing the image with one or more image quality loss processes, such as content loss, perceptual loss, color loss. The image quality loss processes may also be used to train a network for expanding the dynamic range of the input image.

In one example embodiment, the differentiable μ-law to rescale the linear image may be adopted, in which:

$$\mathcal{F}(H) = \frac{\log(1 + \mu H)}{\log(1 + \mu)}, \quad (3)$$

where μ is set to 500 and H is the linear HDR image.

Given the predicted HDR image $\hat{H}$ and the corresponding ground truth H, the content loss is defined as:

$$\mathcal{L}_{con} = \| \mathcal{F}(\hat{H}) - \mathcal{F}(H) \|_2. \quad (4)$$

The VGG network may be used to extract high-level semantic features from both the predicted HDR and the ground truth, and the perceptual loss formulates as follows:

$$\mathcal{L}_{per} = \| \Sigma \theta_i [\phi_i(\mathcal{F}(\hat{H})) - \phi_i(\mathcal{F}(H))] \|_2, \quad (5)$$

where $\phi_i$ represents the i-th layer of VGG and $\theta_i$ is the weight for the contribution of each layer (i.e., i=4,5).

To correct the color in the predicted HDR images, the cosine similarity term to control the color similarity between the R, G, B channels, and the color loss process may be represented as follows:

$$\mathcal{L}_{col} = 1 - \frac{\mathcal{F}(\hat{H}) \cdot \mathcal{F}(H)}{\max(\|F(\hat{H})\|_2 \cdot \|\mathcal{F}(H)\|_2, \epsilon)}. \quad (6)$$

IN one example embodiment, the combination of the three losses are used for network optimization:

$$\mathcal{L} = \mathcal{L}_{con} + \mathcal{L}_{per} + \lambda \mathcal{L}_{col}, \quad (7)$$

where $\lambda = 180/\pi$ in one example embodiment.

Since there is a rather limited dataset containing HDR-SDR image pairs, the inventors have trained a model on a large dataset where the SDR images are generated from the original HDR images.

The HDR images used for training are collected from several existing datasets, including 3003 images in total. Following the SDR image generation method, a set of SDR images is prepared with different exposures from each HDR image. The camera response functions (CRFs) are chosen. Therefore, in the experiment, dataset including 200 k image SDR-HDR image pairs in total were randomly selected for training and evaluation. All the images for training are resized to 256×256, and the images for testing are resized such that the longer side is 1024.

The network is optimized until convergence, where the parameters are set as $\beta_1 = 0.9$ and $\beta_2 = 0.999$. The learning rate and the batch size were set as 7e-5 and 4, respectively. The network is trained to convergence for 150 epochs on a server with GeForce RTX 2080 Ti GPU.

To evaluate the quality of the restored HDR images, HDR-VDP-2, Peak Signal to Noise Ratio (PSNR), Structural Similarity (SSIM), and Feature Similarity (FSIM) are adopted. The HDR-VDP-2 is delicately designed for linear HDR images, and the other three methods aim for evaluating the quality of SDR images. To obtain reliable comparison results, two tone-mapping operators (TMOs) are first applied to convert the HDR images to SDR images, based upon which the PSNR, SSIM, and FSIM scores are calculated.

Regarding tone-mapping, classical Reinhard's TMO and LILO TMO were chosen, as both of them can generate robust results.

The inventors have firstly compare the performance of the present invention with other methods quantitatively. More specifically, the display-referred method was applied to calculate the VDP score. As shown in Table 1, the invention outperforms the others in terms of HDR-VDP-2 metric in the linear domain and achieves the highest PSNR, SSIM, and FSIM scores in the non-linear domain with the two TMOs. The results provide evidence of the effectiveness of the present product.

Figure 7:
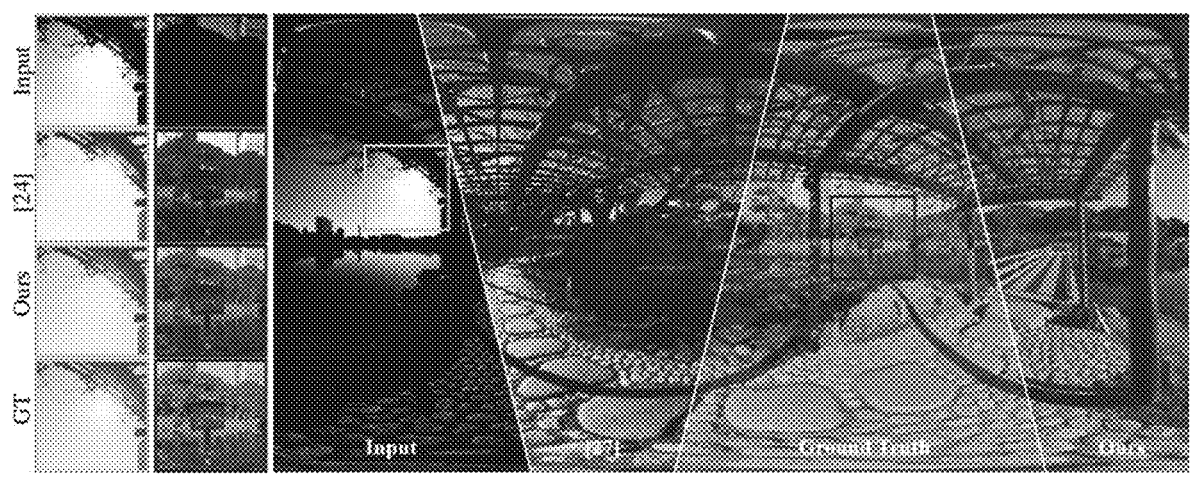
FIG. 7 is an illustration of single-image HDR reconstruction. It is illustrated that the invention provides natural results (on the right most) with visually pleasing textures for single HDR image reconstruction by recovering the missing texture and structural details in the over-exposed region (yellow bounding box) and under-exposed region (red bounding box) compared with comparative example using Single HDR (between the "input" and the "Ground Truth"). All the HDR images are tone mapped for visualization.

Advantageously, the superiority of the present invention lies in two aspects. First, in the under/over-exposed regions, more texture and structural details can be restored while the checkboard artifacts are suppressed. Second, for the SDR images with different exposures of the same scene, more reliable results can be delivered. With reference to FIG. 7, the color of the sky and the wooden beam can be well restored, while the color deviation can be observed in the image enhanced by SingleHDR (the section sandwiched by the input and the Ground Truth in the Fliure), and loss of details is still observable or obvious due to the color deviation in the image enhanced by SingleHDR.

Moreover, the trees and reflections in the water are reconstructed with enriched details.

Figure 8A:
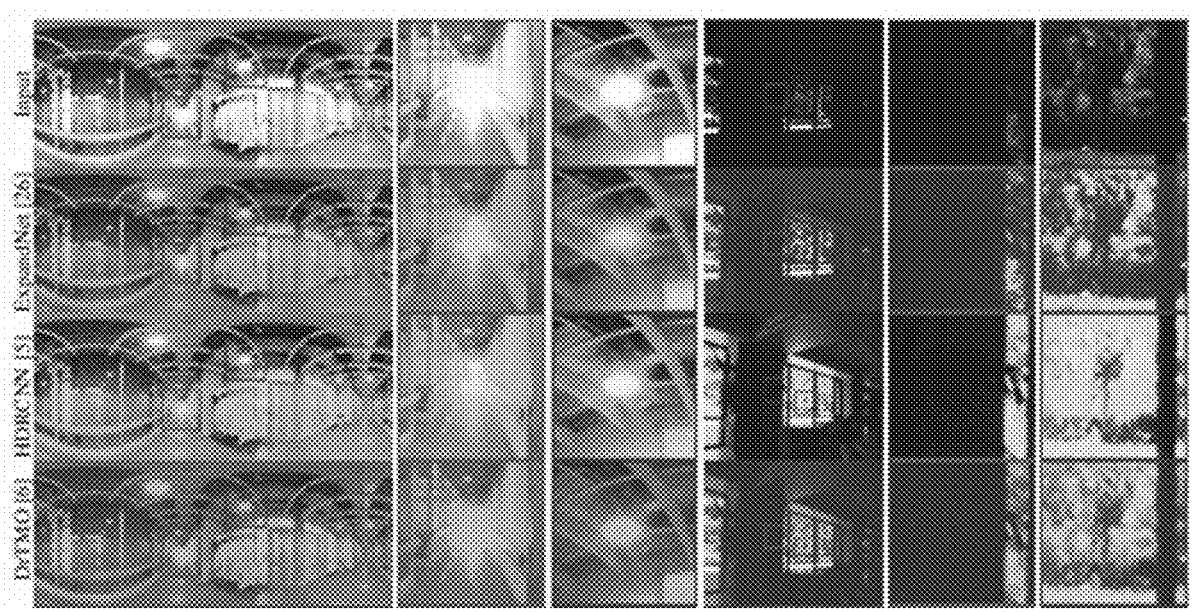
FIGS. 8A and 8B are images showing visual quality comparisons of the reconstructed HDR images. Both under and over-exposed regions can be well reconstructed using the invention.
Figure 8B:
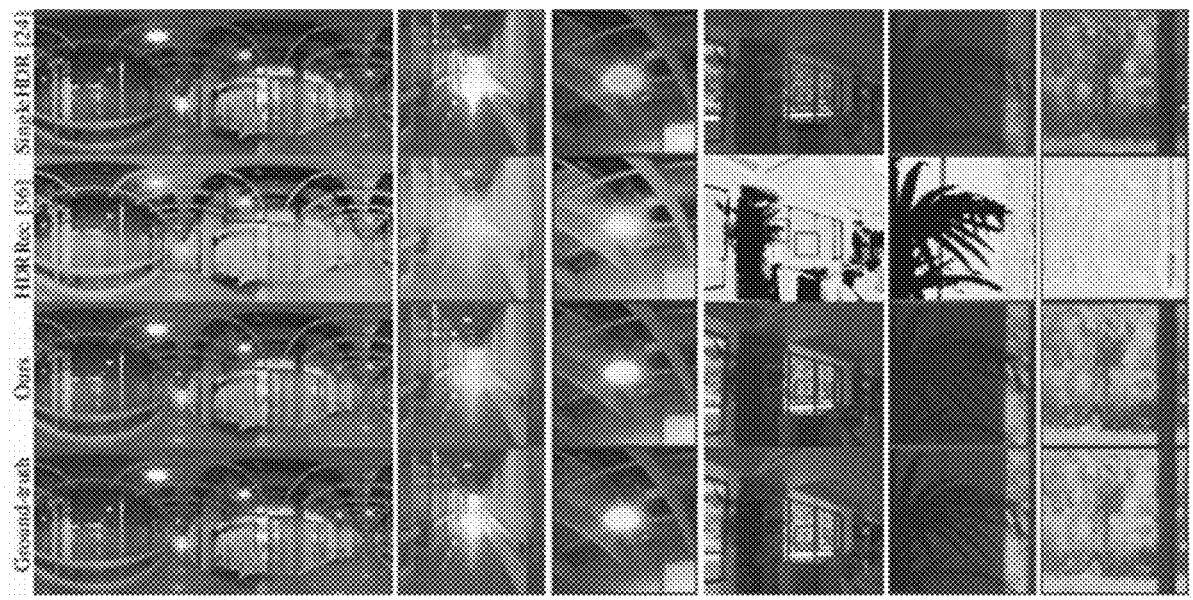

More results for visual quality comparisons are provided in FIGS. 8A and 8B. In particular, the first three columns of FIGS. 8A and 8B show the results that contain more over-exposed regions in the input SDR image. The blurred edges of the light can be observed in existing methods, and the recovered details near the entrance are either too blurry or sharp. By contrast, it is observed that the present invention can generate more natural results with reliable details in the enhanced image.

It is worth mentioning that HDRCNN and HDRRec aim to recover the over-exposed regions in the image. For the rest part of the image, they only apply a straightforward transfer function, such that the recovery of this area could not adapt to different CRFs, which may cause color deviation for the entire image. To further illustrate the performance of the present invention, a challenging SDR image with extremely under-exposed regions was chosen as input, as shown in the fourth column. The green plants in the room and outside of the windows are very dark in the input SDR image. The reconstruction results indicate that the present invention can generate visually pleasant details compared with other methods.

Figure 9:
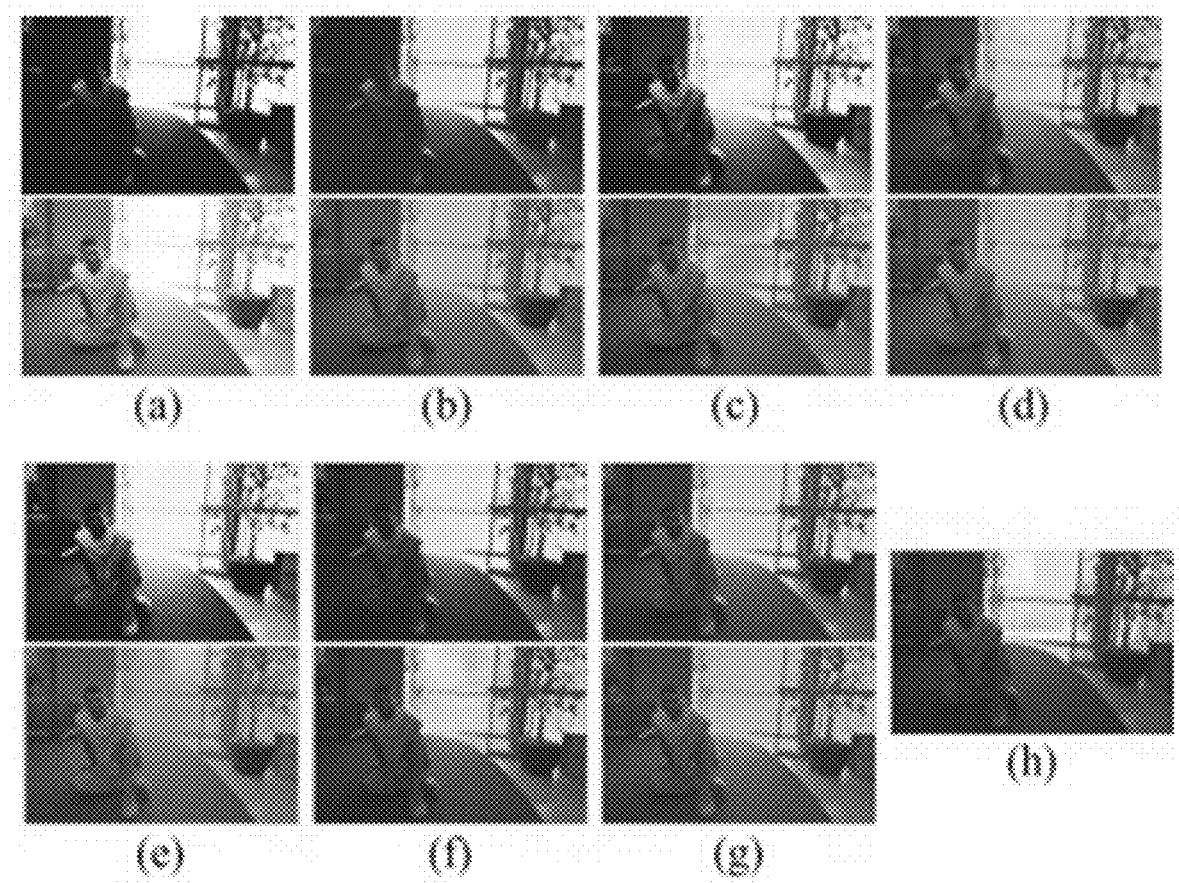
FIG. 9 are images showing visual quality comparisons of the reconstructed HDR images from different exposures: (a) the input SDR image; (b) reconstructed HDR using Expandnet; (c) reconstructed HDR using HDRCNN; reconstructed HDR using DrTMO; (e) reconstructed HDR using HDRRec; (f) reconstructed HDR using SingleHDR; (g) reconstructed HDR using the embodiments of the present invention; (h) an image showing a Ground-truth.

Referring to FIG. 9, the inventors have further study the stability of the present invention. Given a ground-truth HDR image, two SDR images were generated with different exposures, and subsequently, the single image HDR reconstruction methods are applied to these SDR images. The ideal result is that the two HDR images reconstructed from these two SDR images should be identical. However, the checkboard artifacts and color-shift in the over-exposed regions and details loss in the under-exposed regions are observed in other methods. By contrast, the present invention can produce more stable results as shown in (g).

TABLE 2

Evaluation of ECMLM contribution. The PSNR. SSIM. and FSIM scores are calculated based on the tone mapped HDR images.

| Method | HDR-VDP-2 | TM-PSNR | TM-SSIM |
|---|---|---|---|
| Ours | 49.7996 | 19.9714 | 0.7731 |
| Ours w/o LM | 48.9150 | 19.7431 | 0.7591 |
| Ours w/o OB | 49.0159 | 19.8327 | 0.7624 |
| Ours w/o UB | 49.2023 | 19.7480 | 0.7592 |
| Ours w/o OB&UB | 48.7256 | 19.5831 | 0.7616 |

TABLE 3

The evaluation of the loss function used in the present invention.

| $L_{con}$ | $L_{pcr}$ | $L_{col}$ | HDR-VDP-2 |
|---|---|---|---|
| ✓ | | | 33.7858 |
| | ✓ | | 46.0355 |
| | | ✓ | 30.8071 |
| | ✓ | ✓ | 47.7825 |
| ✓ | | | 38.3404 |
| ✓ | ✓ | ✓ | 49.7996 |

Figure 10:
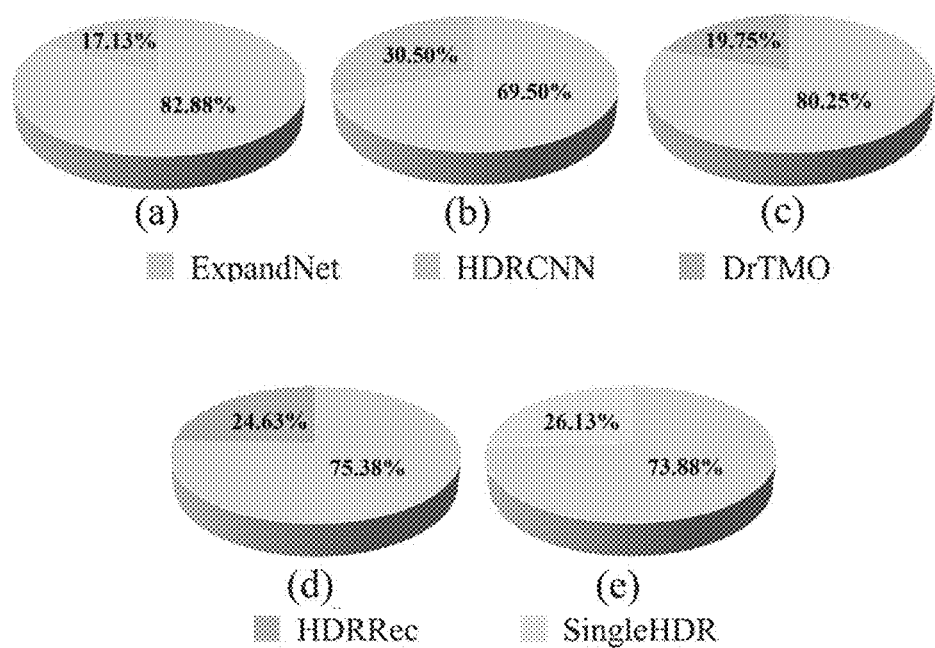
FIG. 10 is an illustration of the subjective testing results. The pie chart indicates participants preference in the present invention vs (a) Expandnet; (b) HDRCNN; (c) DrTMO; (d) HDRRec (e) SingleHDR.

The inventors have further conducted the subjective evaluations to examine the subjective quality of the reconstructed HDR images. The pairwise comparison experiment is applied to force the subjects to choose a preferred image in the two reconstructed HDR images with the ground-truth HDR image as a reference. In particular, 40 SDR images are randomly selected from the test dataset, and 20 subjects participated in this experiment. Dell UltraSharp 27 4K monitor was used for presentation, which has a high contrast ratio of 20000:1, and the viewing distance is set to 80 cm. The maximum brightness of the HDR images is linearly adjusted to 1000 nit. The results are shown in FIG. 10 which indicate that the HDR images reconstructed by the present invention are preferred among 70% of participants when comparing with other methods, verifying the outstanding performance of the present invention.

To illustrate the functionality of the ECMLM, both the confidence maps learning and the structure of the two EGDRBs were evaluated.

More specifically, rather than learning the maps for detail reconstruction in each scale, the down-sampled confidence map of the previous scale is directly used in the next scale. As shown in Table 2, the performance drops significantly compared with the present invention, which certificates the significance of iteratively updating the confidence maps. Moreover, another two experiments are conducted with different structures by removing the EGDRB for the over-exposed region or the under-exposed region. Finally, both EGDRBs for under-/over-exposed regions are removed.

Since the present invention considers both regions, the reconstruction of the structure and texture details is significantly improved. As shown in Table 2, the present invention performs better than all these four structures.

The contribution of each term in the loss function (see Equation (7)) was also evaluated. As shown in Table 3, the loss function can achieve better results, and each term helps improve the final results.

These embodiments may be advantageous in that a novel exposure-induced network is provided to reconstruct HDR image from a single SDR image, which is able to excellently expand the global dynamic range and recover the missing texture and structural details in under-/over-exposed regions.

Advantageously, coupled with the main branch DREB dedicated to expanding the global dynamic range, two EGDRBs are carefully designed to recover the lost information under the guidance of the confidence maps progressively learned by the ECMLM.

Specifically, EGDRBs enjoy the parameters of DREB rather than being independent of each other, which significantly improves the efficiency and makes the reconstructed HDR globally and locally consistent. Extensive experimental results demonstrate the superiority of the present invention and the efficiency of each component.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised.

This will include tablet computers, wearable devices, smart phones, Internet of Things (IoT) devices, edge computing devices, stand alone computers, network computers, cloud based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described.

The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing an image comprising the steps of:
   receiving an input image showing a scene composed by a combination of a plurality of image portions of the input image, wherein one or more of the plurality of image portions is associated with an exposure level deviated from an optimal exposure level;
   processing the input image by applying an exposure/image relationship to the input image, wherein the exposure/image relationship is arranged to adjust the exposure level of each of the plurality of image portions towards the optimal exposure level; and
   generating an enhanced image showing a visual representation of the scene composed by a combination of the plurality of image portions of the input image with an adjusted exposure level,
   wherein one or more of the plurality of image portions is further associated with loss of details in a visual representation of the image due to an over-exposure level or an under-exposure level associated with the corresponding image portions of the image,
   wherein the step of processing the input image by applying the exposure/image relationship to the input image comprises the step of recovering visual details in the image portions associated with the over-exposure level or the under-exposure level, and
wherein the step of processing the input image by applying the exposure/image relationship to the input image comprises the step of processing gated images Io or Iu indicating respectively the image portions associated with the over-exposure level or the under-exposure level with a confidence map Mo or Mu, to determine a probability of information loss in the corresponding image portion.

2. The method for processing an image in accordance with claim 1, wherein the confidence map is further represented by Moi or Mui of multiple scales i indicating the level of over-exposure or under-exposure.

3. The method for processing an image in accordance with claim 2, wherein the confidence map Moi or Mui⁻ is represented by Wf×Wm, wherein Wf denotes a feature weight map obtained by passing an output feature map associated with the (i−1)th scale through a convolution layer and a Sigmoid function, and Wm denotes a down-sampled confidence map of the ith scale obtained by average pooling operation of a confidence map of the (i−1)th scale.

4. The method for processing an image in accordance with claim 3, wherein the confidence map is trained by a learning network.

5. The method for processing an image in accordance with claim 4, wherein the learning network is a convolution neural network (CNN).

6. The method for processing an image in accordance with claim 5, wherein the learning network has a progressive learning structure.

7. The method for processing an image in accordance with claim 6, wherein the step of processing the input image by applying the exposure/image relationship to the input image comprises the step of progressively recovering visual details of different image portions associated with different over-exposure levels or different under-exposure level with confidence maps Moi or Mui of multiple scales i.

8. The method for processing an image in accordance with claim 7, wherein the step of processing the input image by applying the exposure/image relationship to the input image comprises the step of expanding a dynamic range of the input image.

9. The method for processing an image in accordance with claim 8, wherein the step of expanding the dynamic range of the input image comprises the step of concatenating features of remaining image portions of the input image with the optimal exposure level and the image portions associated with the over-exposure level or the under-exposure level with recovered visual details.

10. The method for processing an image in accordance with claim 9, wherein the step of generating the enhanced image further comprising the step of generating a high dynamic range (HDR) image based on the input image of a standard dynamic range (SDR) image.

11. The method for processing an image in accordance with claim 10, wherein the step of expanding the dynamic range of the input image comprises the step of processing the image with one or more image quality loss processes.

12. The method for processing an image in accordance with claim 11, wherein the one or more image quality loss processes include content loss, perceptual loss, color loss or any combination thereof.

13. A system for processing an image comprising:
   an image gateway arranged to receive an input image showing a scene composed by a combination of a plurality of image portions of the input image, wherein one or more of the plurality of image portions is associated with an exposure level deviated from an optimal exposure level; and
   an enhancement engine arranged to process the input image by applying an exposure/image relationship to the input image, wherein the exposure/image relationship is arranged to adjust the exposure level of each of the plurality of image portions towards the optimal exposure level; and to generate an enhanced image showing a visual representation of the scene composed by a combination of the plurality of image portions of the input image with an adjusted exposure level,
   wherein one or more of the plurality of image portions is further associated with loss of details in a visual representation of the image due to an over-exposure level or an under-exposure level associated with the corresponding image portions of the image,
   wherein the enhancement engine comprises an exposure gated detail recovering module arranged to recover visual details in the image portions associated with the over-exposure level or the under-exposure level,
   wherein the enhancement engine further comprises a dynamic range expansion module arranged to expand a dynamic range of the input image,
wherein the dynamic range expansion module includes a feature fusion module arranged to combine features of remaining image portions of the input image with the optimal exposure level and the image portions associated with the over-exposure level or the under-exposure level with visual details recovered by the exposure gated detail recovering module.

* * * * *